(No Model.) 2 Sheets—Sheet 1.
M. J. WIGHTMAN.
ELECTRIC RAILWAY.
No. 442,407. Patented Dec. 9, 1890.
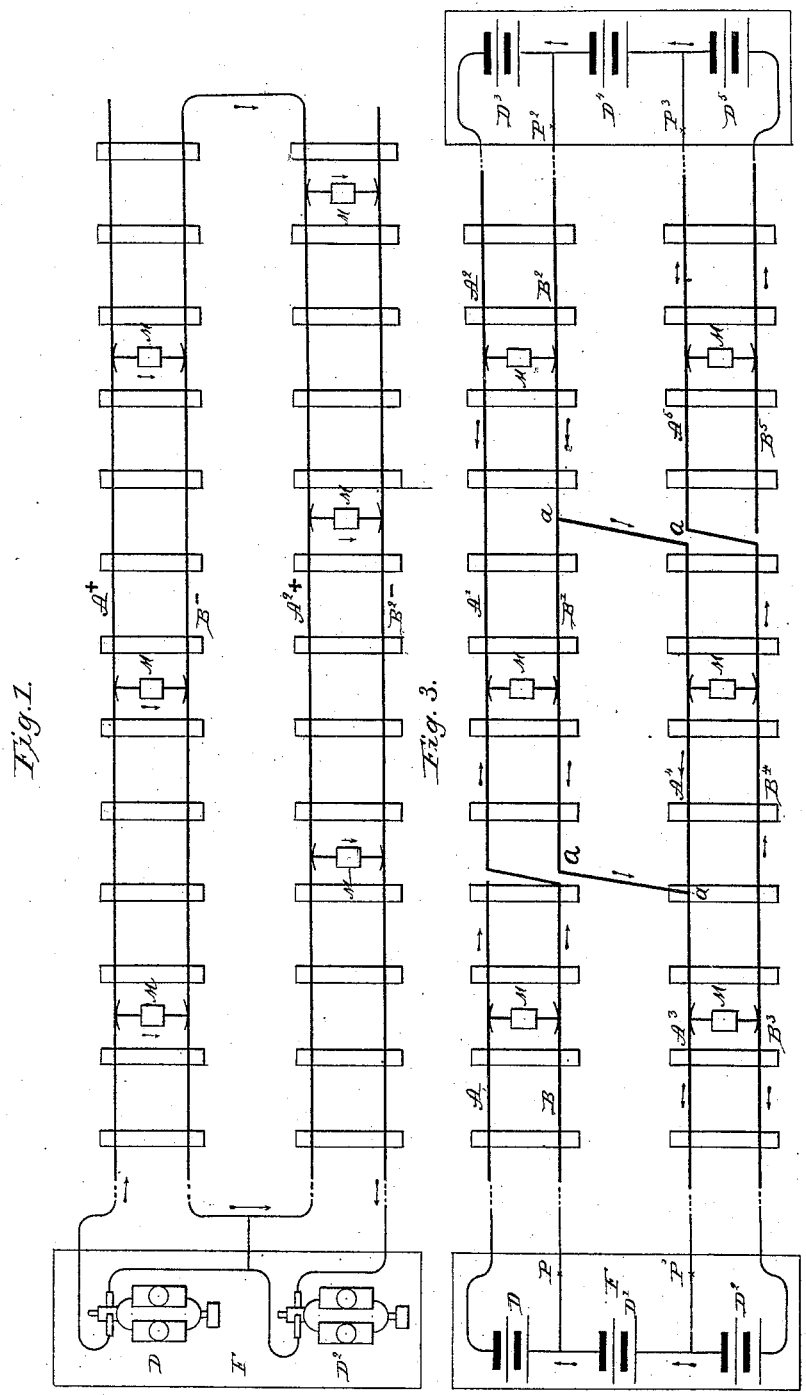
Witnesses:
Ernest Abshagen
Thos Toomey
Inventor:
Merle J. Wightman
By his Attorney:

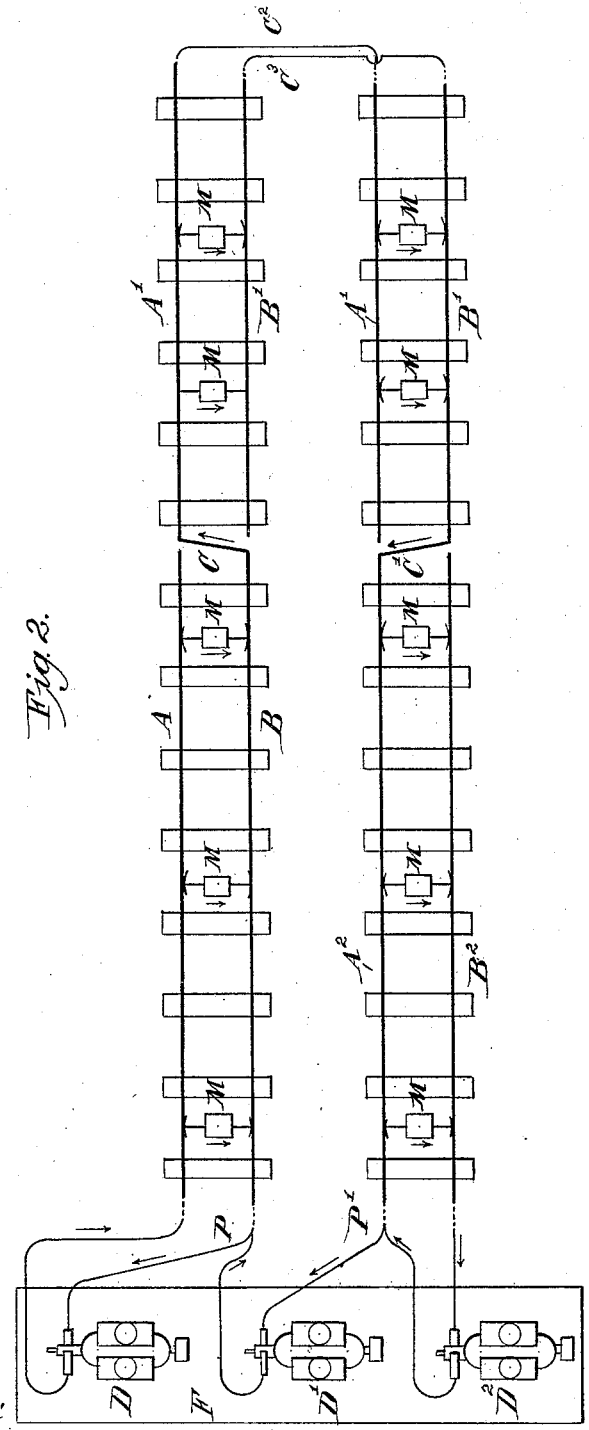

UNITED STATES PATENT OFFICE.

MERLE J. WIGHTMAN, OF HARTFORD, CONNECTICUT.

ELECTRIC RAILWAY.

SPECIFICATION forming part of Letters Patent No. 442,407, dated December 9, 1890.

Application filed April 1, 1885. Serial No. 160,855. (No model.)

*To all whom it may concern:*

Be it known that I, MERLE J. WIGHTMAN, a citizen of the United States, and a resident of Hartford, in the county of Hartford and State of Connecticut, have invented certain new and useful Improvements in Electric Railways, of which the following is a specification.

My invention relates to electric railways, and more especially to railways in which electric-railway motors on different tracks or portions of track are to be operated or controlled at the same time.

My invention pertains especially to the arrangements of supply conductors or mains; and its purpose is to economize in the use of conductor, as well as to secure simplicity of arrangement and independence of action in the electric motors on different lines or sections of lines of rails.

The invention consists in the novel arrangements, hereinafter described, of supply-conductor and connections of the same with one another and with the generating source, and involves the employment of the system of supply and connection which is now known as the "three-wire system," wherein the translating devices are supplied in series multiple arc, and intermediate points of the system of supply, regarding the same as a series system, are connected with intermediate points or points of division of the translating devices or connections, which are frequently termed "compensating conductors" or connections.

My invention consists, among other things, in a special improved arrangement of supply-conductors for an electric railway, wherein the supply-mains for the motors of one section are connected to the source through the supply-conductors of another section, as will hereinafter more particularly appear.

My invention consists, also, in other specific combinations and arrangements, stated in the claims. It should be understood at the outset that in each of the sections or sets of supply-conductors the motors run from such sections are fed in multiple in the well-known manner.

By the improved arrangement hereinafter described I secure the important advantage that the current to motors on any section or upon either track may be regulated and that variations of speed of the motor or motors on one track or section and consequent variations of counter electro-motive force will not sensibly, because of the connections to the electric source, affect at intermediate points the supply of current to motors on other sections.

My invention also makes it practicable to operate a double-track electric railway with currents of higher tension and with less size of conductor than would be the case if all the motors were in multiple arc with one another. This is an important consideration, especially in those cases where the rails of the track are to be utilized as conductors, but are of limited cross-section.

In the drawings, Figure 1 is a diagram illustrating the principle of the three-wire system before referred to in its application to two sections of supply-conductors of an electric railway, wherein but two sections are employed and are parallel to one another. Figs. 2 and 3 are diagrams illustrating my present invention.

In the various figures of the drawings I have shown the rails employed as the supply-mains from which current is taken up by the railway-motors as they travel over them, this being a common expedient in operating electrical railways. I do not, however, wish to be understood as limiting myself to such special form and manner of supply, but have shown the railway-rails used as supply-conductors as typical only of any supply-conductors of proper kind or combined with proper appliances upon the motor to permit the current to be taken up from one main and discharged into the other as the motor moves.

In order to make clear the improvements forming my present invention, I will first describe the principle of the three-wire system as applied in a simple and obvious fashion to two sections or sets of supply-conductors for the parallel tracks of an electric railway, as illustrated in Fig. 1, and will then go on to describe the improved arrangements which I herein claim as my invention.

Referring to Fig. 1, A B indicate the rails of a section of railway-track upon a double track, and $A^2$ $B^2$ a similar section upon another track thereof. The rails serve as the supply-conductors to motors, (indicated at M,) which travel over the lines of rails and derive their operating-current from them.

F indicates a station having electric generators, two of which are shown at D D², and consist of dynamo-machines, secondary batteries, or other electric source. The generators are supposed to have approximately the same electro-motive force, and are connected in series between the supply conductor or main A of one section (which conductor I shall for the sake of convenience designate the "positive main") and the negative main or conductor B² of the other section. The remaing supply conductors or mains B A² become then, respectively, negative and positive. The latter two are connected together at one or more points, as indicated, and are also connected at a point between the two generators D D², as shown. The motors of each section are thus supplied and run independently and in multiple arc; but the motors of one section are connected in series with the motors of the other. The two sections thus connected are supposed to be of approximately the same length, or so selected that approximately the same number of motors will be running over each section. This is not, however, necessary, and it is one of the merits of the system that it permits a difference in the number of motors on the two sections and allows the motors of one section to be at rest without deranging the flow of current to motors on the other. The one section might be much longer, and might supply normally a much larger number of motors than the other; but the point of intermediate connection to the electric source should then be correspondingly changed, so as to bring it to the normal electric center or point of no potential. The generators D D² here constitute the divided source of electrical energy, and the connection from the intermediate portion thereof to the system of supply-conductors at an intermediate point of the system, considered as a series system, constitutes the well-known compensating connection of the three-wire principle.

In the improved arrangement shown in Fig. 2, constituting my invention, I have illustrated a third section of supply conductor or main designated by the letters A' B', which section is, as shown, located at a point more remote from the generating source than the section A B for the section A² B². In this figure, inasmuch as there are three separate sections, there are provided three separate generators, or a source of supply having connections to two intermediate points of the series of generators.

The section A' B' does not have immediate connection with the source through independent conductors, but is connected therewith through the sections of supply-conductors in other sets, as indicated. Thus, as shown, the supply-conductor A' has connection formed with an intermediate point of the supply source through the supply-conductor B of the set or section A B. Similarly the more remote section of supply-conductor B' has connection formed with a point of the divided source of energy through the supply-conductor A² of a nearer section. The terminals of the divided source are connected to the exterior supply-conductors A B² of the system, as shown, so that there is constituted in effect a series multiple-arc system wherein the compensating action of the three-wire system exists, the system indicated being in substance a four-wire system or a three-wire system extended to contain a third set of apparatus supplied in multiple to one another, but in series with the two other sets or sections, the intermediate portion of which connects to an intermediate portion or point of division at the supply-source. The section A' B', which is more remote, might be on any line of track, though it is shown here as a part of the line of track over which motors proceed from the section A B. It is also obvious that the section A' B' might be wholly on one track or made up of sections on different tracks, as shown. By this arrangement the section A' B', though remote from the central station, works in the same manner in the system as if it had connection with the intermediate points of the source through separate conductors instead of through the supply-conductors of other sections in the manner shown. Under normal conditions the current will flow through the three sections in series multiple arc; but an increase of resistance in one will not affect others, because under the conditions shown current will find its way to or from the source through the connections at intermediate points.

In Fig. 3 I have illustrated an improved arrangement of the supply-conductors adapted for use on a considerable length of railway.

Sections A B, A' B', and A³ B³ correspond to sections A B, A' B', and A² B² in the system shown in Fig. 2, while sections A⁵ B⁵, A⁴ B⁴, A² B² correspond in like manner to the same system inverted in position in the diagram. The sections of the supply source having intermediate points connected to the system of supply-conductors, in the manner already described, are indicated at D³ D⁴ D⁵, and are located at or near the terminal of the combined system remote from the sections D D' D².

The points $a\ a\ a\ a$ where the potential of the two sections is the same are joined.

It will be seen that by this system the current supplied to each section can be independently regulated; that the conductors required in this system would be of the same size as those used for a multiple system of the size of any one section, and that a comparatively like potential would be secured throughout the whole line.

What I claim as my invention is—

1. In an electric-railway system, the combination, with a divided source of electricity, of sections of supply-conductor located at different distances from the source, and an electric connection for a supply-conductor of a more remote section formed with said source through the supply-conductor of a nearer section, as and for the purpose described.

2. In an electric-railway system, the combination, with a divided source of energy, of three sets of supply-conductor for different sections of railway-track, two of such sets being connected to terminals of the source and divisions thereof, as described, while the third section of supply-conductors, which are more remote from the source, are connected, respectively, with said source through the supply-conductors of the first two sets.

3. In an electric-railway system, the combination, with a divided source of energy, of two sets of supply-conductors for different sections of railway-track connected to the terminals of the source and to points of division of such source, in the manner described, and a third section of supply-conductors having electrical connection with points of division of the source through the supply-conductors of the first two sets.

4. The combination, in an electric-railway system, of a divided source of electricity, a number of sections of supply-conductor for different sections of railway-track, electric motors supplied from such sections in series multiple arc, as described, and an electric connection from a set of supply-conductors remote from the source formed through the supply-conductors of the nearer sections.

5. The combination, substantially as described, of two sections of electric railway, a positive supply-conductor of one section and a negative supply-conductor of the other connected to the extremes of the electric sources, connections from the remaining negative and positive conductors of the two sections to an intermediate point of the source, and a third section of railway remote from the generating-station, having supply-conductors connected to the source through the supply-conductors of the other sections.

6. The combination, with two or more systems or sections of supply-mains in an electric railway, of separate supply sources and connections from one system or section to another at points of equal potential, as and for the purpose described.

7. The combination, in an electric railway, of two or more sources of divided energy placed at points remote from one another, an intermediate railway having sections of supply conductor or mains connected to terminals of such sources and to points of division of the same, railway-motors supplied from said several sections in multiple arc, and electric connections from the portion of the system connected immediately with the source at one end to the portion of the system supplied immediately from the other end at an intermediate part of the combined systems between the points of supply.

8. The combination, with two or more systems or sections of supply mains or conductors in an electric railway, of separate divided supply sources removed from one another and connected to such system, as described, and electrical connections from points in parts of the system where the potential is normally about the same.

9. The combination, in an electric-railway system, of three sections of supply-conductor having a section $A'B'$ connected to points of division of the electric source and forming an intermediate section in a multiple-arc series system, as described, three other sections of supply-conductor having suitably-divided sources of supply, and a section $A^4 B^4$ connected to intermediate points of the said source of supply and forming an intermediate section in the multiple-arc series system with the two other sections, and electrical connection between the sections $A'B'$ and $A^4 B^4$.

10. In an electric railway, a set or section of working-conductors $A'B'$, supplied from opposite ends with energy from a suitable source and having connection with a point of division of such source, and a second set of supply-conductors $A^4 B^4$, similarly supplied and connected and joined to the set $A'B'$.

Signed at Hartford, in the county of Hartford and State of Connecticut, this 24th day of March, A. D. 1885.

MERLE J. WIGHTMAN.

Witnesses:
H. M. LINNELL,
CHAS. E. DUSTIN.